UNITED STATES PATENT OFFICE.

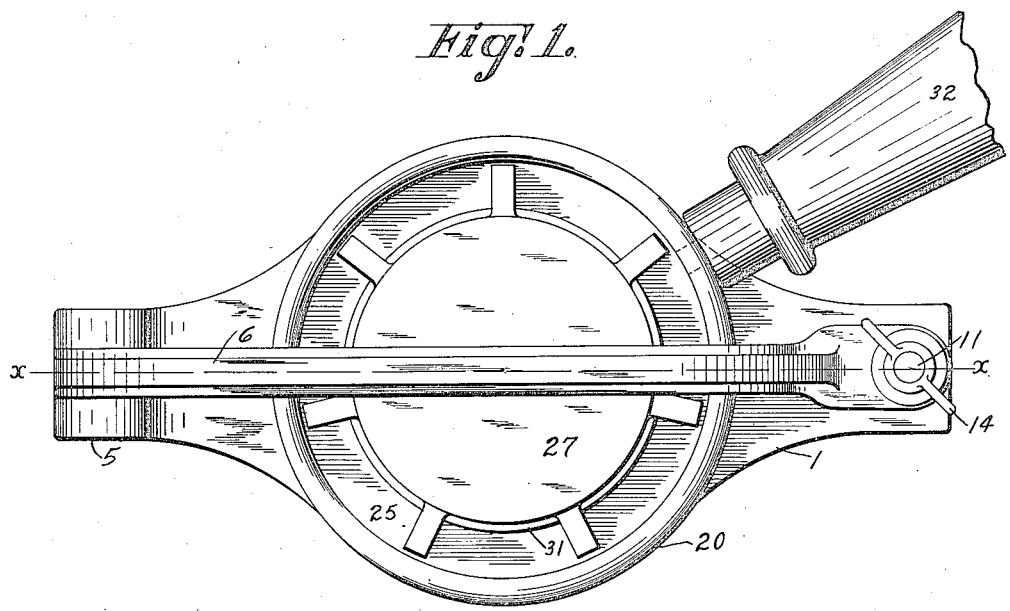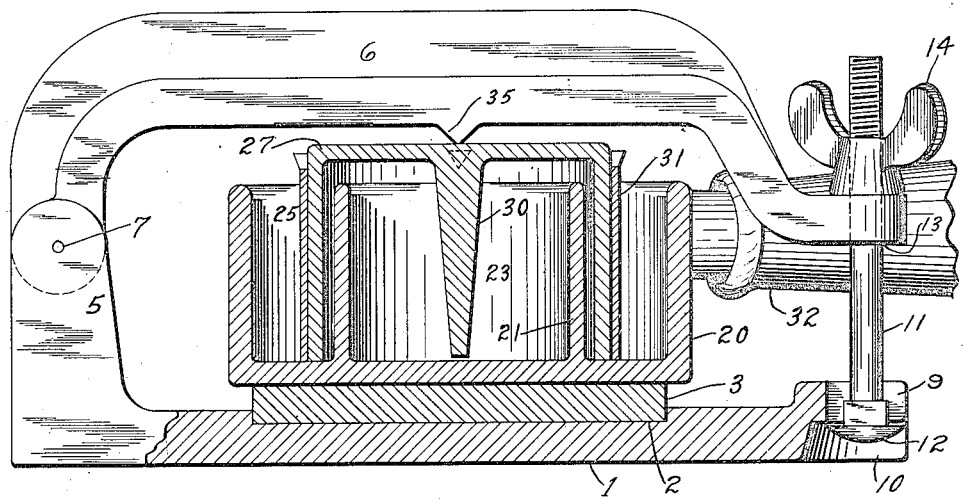

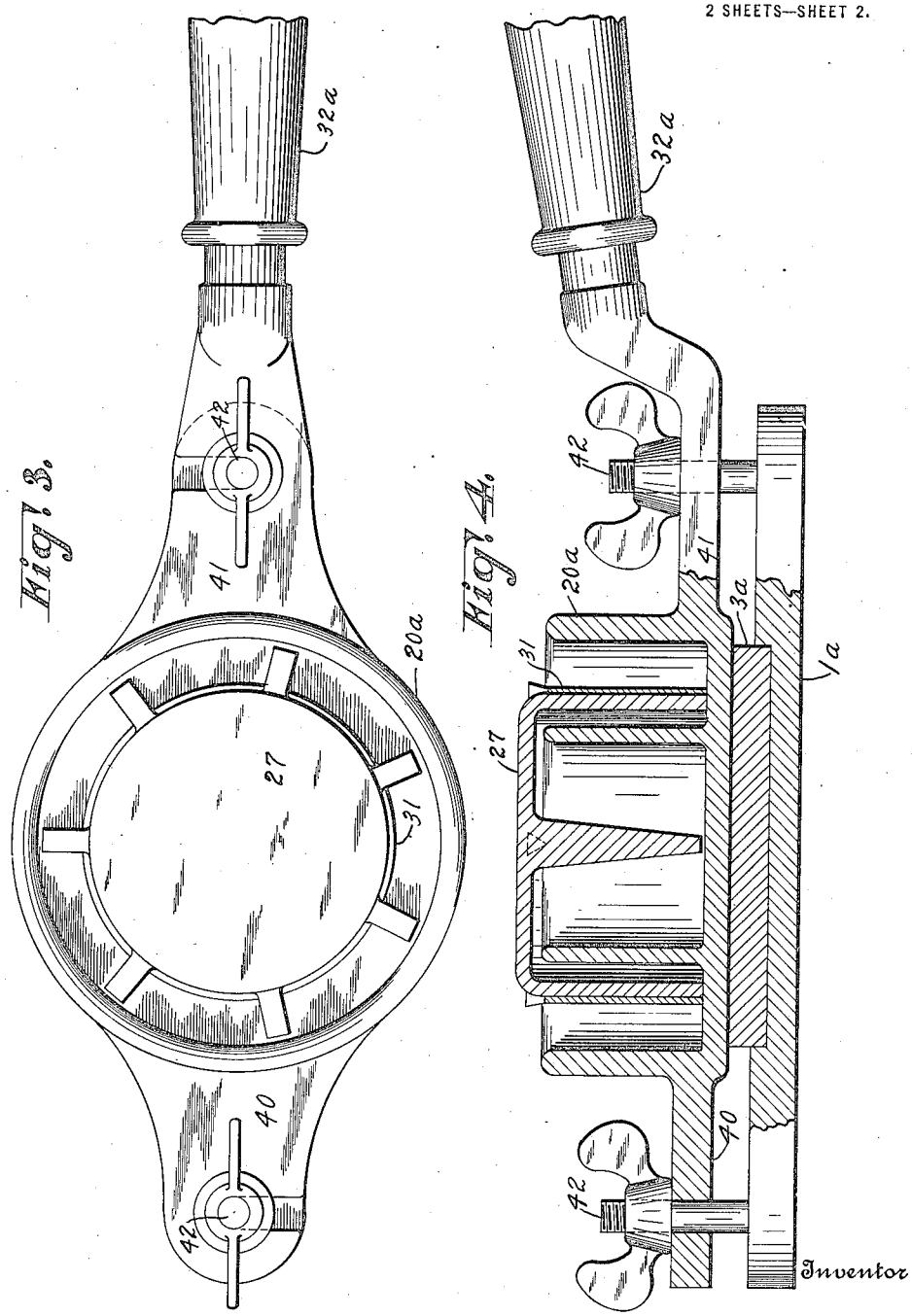

CLARENCE A. SHALER, OF WAUPUN, WISCONSIN.

VULCANIZER.

1,169,576.  Specification of Letters Patent.  Patented Jan. 25, 1916.

Application filed January 6, 1913. Serial No. 740,358.

*To all whom it may concern:*

Be it known that I, CLARENCE A. SHALER, a citizen of the United States, residing at Waupun, county of Fond du Lac, and State of Wisconsin, have invented new and useful Improvements in Vulcanizers, of which the following is a specification.

My invention relates to improvements in vulcanizers of that class in which a quantity of combustible liquid is contained within the body of the vulcanizer.

The object of my invention is to provide means whereby the liquid will be vaporized and burned as a gas, thus securing a more effective control of the combustion, avoiding a direct exposure of the liquid to the open air, and preventing accidents such as might occur from an accidental spilling of the liquid.

A further object of my invention is to provide improved clamping mechanism which is effective to not only clamp the vulcanizer upon the work but to also hold a covering cap in position whereby a direct combustion of the liquid is prevented.

In the drawings, Figure 1 is a plan view of a vulcanizer embodying my invention. Fig. 2 is a sectional view of the same drawn on line x—x of Fig. 1. Figs. 3 and 4 are views similar to Figs. 1 and 2 but showing a modified form of construction.

Like parts are identified by the same reference characters throughout the several views.

A base 1 is provided with a recess 2 in which a body of non-conducting material 3 is mounted, said material preferably comprising a thick layer or sheet of asbestos fiber or equivalent material. At one end the base is provided with a raised arm 5 to which a clamping lever 6 is pivotally connected at 7. At the other end the base is provided with a notch 9 and a recess 10. A bolt 11 passes through the notch 9 with the head 12 engaging in the recess 10, the other end of the bolt passing through an eye at 13 and having a clamping thumb nut 14 threaded thereon, whereby the lever 6 may be drawn downwardly toward this end of the base.

A cup shaped member 20 is provided with an annular inner wall 21 whereby the interior of the cup shaped member is subdivided into a central chamber 23 surrounded by an annular chamber 25. Another cup shaped member 27, inverted, is adapted to fit over the wall 21 with the side walls of the member 27 extending into the channel 25. The top of the member 27 is preferably supported above the margin of the wall 21. A central projection 30 extends downwardly from the top of the member 27 into the cavity 23.

The outer surface of the member 27 is covered with an asbestos wick 31 and the outer wall of the member 20 is provided with a suitable handle 32. A projection 35 on the lever 6 is adapted to bear centrally upon the top of the inverted cup 27, whereby said cup is held in position by the clamping lever 6.

In use the material to be vulcanized is placed between the bottom of the cup shaped member 20 and the plate or layer of asbestos 3. A quantity of combustible fluid, such as gasolene, is supplied to the cavity 23, and the cap or inverted cup shaped member 27 is then applied, in covering position with projection 30 extending downwardly into the gasolene in cavity 23 after which lever 6 will be swung to clamping position and secured in said position by the bolt 11 and thumb nut 14, thereby not only binding the member 20 upon the work, but also binding the cap 27 in position. If desired, a small quantity of water may be inserted in the cavities 23 and 25. The gasolene will float upon the surface of the water in the cavity 23 so that combustion will not be interfered with. A small quantity of gasolene is then poured upon the wick 31 and ignited. The heat will be conveyed to the gasolene in the cavity 23 through the projection 30, causing said gasolene to vaporize, whereupon the vapor will pass over the wall 21 and downwardly under the wall of the cap in the cavity 25, the gas igniting and maintaining combustion in said cavity 25 until the supply of gasolene in cavity 23 is exhausted.

Experiments which I have conducted demonstrate that it is possible to secure and maintain a vulcanizing temperature for a sufficient period to effect a thorough curing of properly prepared rubber.

With the device above described the consumption of gasolene is much slower than with an open cup vulcanizer, thus enabling me to continue the process for a longer period with a given quantity of gasolene. The gas escapes into the cavity 25 to maintain the combustion, even though the cap 27 is tightly clamped against the bottom of said cavity, the contacting metal surface not being ground or faced off to make a tight joint.

Referring to Figs. 3 and 4 it will be observed that the construction of the vulcanizer proper is substantially the same, a base plate 1ª being employed which carries an asbestos plate 3ª, against which the material is clamped by a cup shaped member 20ª of the same form as the cup shaped member 20 in Figs. 1 and 2, except that it is provided with downwardly projecting lugs 40 and 41 through which clamping bolts 42 pass for the purpose of connecting the cup 20ª with the base 1ª. In this construction also a handle 32ª is secured to the lug 41 instead of being connected directly with the cup as in Fig. 2. The cap 27 and wick 31 are identical with those shown in Figs. 1 and 2. This construction will be used where it is not convenient to employ the clamping lever 6 and where the vulcanizer will be maintained in substantially a horizontal position during use. The device shown in Figs. 1 and 2 can be adjusted in various positions after ignition without permitting escape of gasolene more rapidly than it can be burned.

I claim:—

1. The combination with a cup shaped vulcanizing member sub-divided into a plurality of cavities, and a closed cap covering one of said cavities and having a wall extending into another cavity with its lower margin resting upon the bottom thereof, said wall subdividing said other cavity, the outer portion of which is open to the exterior and constitutes a combustion chamber; the covered cavity being adapted to contain a quantity of combustible fluid and said cap being adapted to permit vapor from the covered cavity to pass downwardly in the other cavity underneath the margin of the cap wall and upwardly in said combustion chamber.

2. The combination with a vulcanizing plate having a fuel retaining cup upon its upper surface, and a closed cap covering said cup and having a depending flange bearing upon said plate at the sides of the cup and beneath the margin of which gas may escape from the cup.

3. The combination with a vulcanizing plate having upwardly projecting flanges forming a plurality of open cavities, one concentric with another, and a cap covering one of said cavities and having a depending flange in another cavity concentric thereto, said flange having a wick exposed upon its outer surface to facilitate ignition and preliminary heating.

4. The combination with a vulcanizing plate having upwardly projecting flanges forming a plurality of open cavities, one concentric with another and a cap covering one of said cavities and having a depending flange in another cavity concentric thereto, a base plate and a clamping lever connected with the base and adapted to engage said cap.

5. The combination with a base plate, of a non-heat-conducting plate mounted thereon, a vulcanizing plate in clamping relation to the non-heat-conducting plate and provided with a cup for liquid fuel on its upper surface, a closed cap covering the cup and having downwardly projecting margins bearing upon said plate, a clamping device for holding the cap in position, and a projection extending downwardly from the cap into the cup.

6. A vulcanizer having in combination, a vulcanizing plate, a chamber having separable walls supported from said plate, and adapted to receive combustible fluid, an inverted cup shaped cap covering said fluid receiving chamber with its side walls bearing upon said plate, a heat conveying member extending from the top wall of said cap downwardly into the fluid in the receiving chamber, whereby said fluid is vaporized by conduction of heat from the walls of said cap, and means for utilizing vapor from such fluid to maintain combustion in heating relation to said plate.

7. A vulcanizer plate, provided with a liquid holding chamber, having an annular gas delivery passage leading from the upper portion of said chamber downwardly and outwardly to an exterior ignition zone, where combustion may be maintained in heating relation to the plate.

In testimony whereof I affix my signature in the presence of two witnesses.

CLARENCE A. SHALER.

Witnesses:
 JOSIE SCHIPPERS,
 BLANCHE WOOD.